United States Patent [19]

Chaloner-Gill et al.

[11] Patent Number: 5,985,487
[45] Date of Patent: *Nov. 16, 1999

[54] CURABLE ALKANE MULTIFUNCTIONAL ACRYLATES BASED SOLID ELECTROLYTES AND ELECTROLYTIC CELLS PRODUCED THEREFROM

[75] Inventors: Benjamin Chaloner-Gill, Santa Clara, Calif.; M. Neal Golovin, Marietta, Ga.

[73] Assignee: Valence Technology, Inc., Henderson, Nev.

[ * ] Notice: This patent is subject to a terminal disclaimer.

[21] Appl. No.: 08/749,731

[22] Filed: Nov. 15, 1996

Related U.S. Application Data

[63] Continuation of application No. 08/421,592, Apr. 12, 1995, abandoned.

[51] Int. Cl.$^6$ ........................................... H01M 6/18
[52] U.S. Cl. ..................... 429/189; 429/304; 429/306; 429/307; 429/309; 429/317; 252/62.2; 204/242
[58] Field of Search ........................... 252/62.2; 429/192, 429/189, 191, 193, 194, 196, 198, 224, 216, 304, 306, 307, 309, 317; 204/242

[56] References Cited

U.S. PATENT DOCUMENTS

| H1462 | 7/1995 | Walker, Jr. | 429/191 |
|---|---|---|---|
| 4,830,939 | 5/1989 | Lee et al. | 429/192 |
| 5,219,680 | 6/1993 | Fauteux | 429/192 |
| 5,455,127 | 10/1995 | Olsen et al. | 429/192 |
| 5,463,179 | 10/1995 | Chaloner-Gill et al. | 429/192 |
| 5,501,921 | 3/1996 | Olsen | 429/192 |

*Primary Examiner*—Alan Diamond
*Attorney, Agent, or Firm*—Young & Basile, P.C.

[57] ABSTRACT

This invention is directed to a solid electrolyte containing an alkane multifunctional acrylate polymeric matrix, a salt, a solvent, and preferably a viscosifier, as well as, electrolytic cells prepared from such solid electrolytes.

22 Claims, No Drawings

CURABLE ALKANE MULTIFUNCTIONAL ACRYLATES BASED SOLID ELECTROLYTES AND ELECTROLYTIC CELLS PRODUCED THEREFROM

This application is a continuation of application Ser. No. 08/421,592, filed Apr. 12, 1995 now abandoned.

BACKGROUND OF THE INVENTION

1. Field of the Invention

This invention is directed to alkane multifunctional acrylates based solid polymer electrolytes, in particular, to solid electrolytes containing a solid matrix formed from alkane multifunctional acrylates, a salt, a solvent, and a viscosifier. This invention is further directed to solid electrolytic cells (batteries) containing an anode, a cathode and a solid electrolyte formed from an alkane multifunctional acrylate.

2. State of the Art

Electrolytic cells containing an anode, a cathode and a solid, solvent-containing electrolyte incorporating a salt are known in the art and are usually referred to as "solid batteries". These cells offer a number of advantages over electrolytic cells containing a liquid electrolyte (i.e., "liquid batteries") including improved safety features. Notwithstanding their advantages, the manufacture of these solid batteries requires careful process controls to maximize the adherence of the various layers during formation of the electrolytic cells. Poorly adhered laminates inhibit battery performance and significantly reduce charge and discharge capacity.

Specifically, solid batteries employ a solid electrolyte interposed between a cathode and an anode. The solid electrolyte contains either an inorganic or an organic matrix and a suitable salt, such as an inorganic ion salt, as a separate component. The inorganic matrix may be non-polymeric, e.g, β-alumina, silver oxide, lithium iodide, and the like, or polymeric, e.g., inorganic (polyphosphazene) polymers, whereas the organic matrix is typically polymeric. Suitable organic polymeric matrices are well known in the art and are typically organic polymers obtained by polymerization of a suitable organic monomer as described, for example, in U.S. Pat. No. 4,908,283. Suitable organic monomers include, by way of example, ethylene oxide, propylene oxide, ethyleneimine, epichlorohydrin, ethylene succinate, and an acryloyl-derivatized alkylene oxide containing an acryloyl group of the formula $CH_2=CR'C(O)O-$ where R' is hydrogen or a lower alkyl of from 1–6 carbon atoms.

The solid electrolytes also contain a solvent (plasticizer) which is typically added to the matrix primarily to the conductivity of the electrolytic cell. In this regard, the solvent requirements of the solvent used in the solid electrolyte have been art recognized to be different from the solvent requirements in liquid electrolytes. For example, solid electrolytes require a lower solvent volatility as compared to the solvent volatilities permitted in liquid electrolytes. Suitable solvents well known in the art for use in such solid electrolytes include, by way of example, propylene carbonate, ethylene carbonate, γ-butyrolactone, tetrahydrofuran, glyme (dimethoxyethane), diglyme, triglyme, tetraglyme, dimethylsulfoxide, dioxolane, sulfolane and the like.

Because of their expense and difficulty in forming into a variety of shapes, inorganic non-polymeric matrices are generally not preferred and the art typically employs a solid electrolyte containing a polymeric matrix. Nevertheless, electrolytic cells containing a solid electrolyte containing a polymeric matrix suffer from low ion conductivity and, accordingly, in order to maximize the conductivity of these materials, the matrix is generally constructed into a very thin film, i.e., on the order of about 25 to about 250 μm. As is apparent, the reduced thickness of the film reduces the total amount of internal resistance within the electrolyte thereby minimizing losses in conductivity due to internal resistance.

In view of this, the art is searching for methods to improve solid electrolyte manufacture and increase electrolyte conductivity as well as to improve the battery capacity and charge transference of solid batteries employing such electrolytes.

SUMMARY OF THE INVENTION

The present invention is directed, in part, to the discovery that the use of an alkane multifunctional acrylate in preparing a solid, solvent-containing electrolyte provides for several benefits to the solid electrolyte manufacturing process and battery performance. In particular, solid, solvent-containing electrolytes with polymeric matrices derived from alkane multifunctional acrylates demonstrate improved conductivity and charge transfer. This results in increased electrochemical cell and battery capacity.

Accordingly, in one of its composition aspects, the invention is directed to an electrolyte composition which comprises: an alkane multifunctional acrylate solid matrix forming monomer or partial polymer; a salt; a solvent; and a viscosifier.

In another of its aspects, the invention is directed to a solid, single-phase, solvent-containing electrolyte which comprises: a solid polymeric matrix derived by polymerizing an alkane multifunctional acrylate; a salt; a solvent; and a viscosifier.

In another of its aspects, the invention is directed to an electrolytic cell which comprises: an anode; a cathode; and interposed between the anode and cathode, a solid, solvent-containing electrolyte which comprises: a solid polymeric matrix derived by polymerizing an alkane multifunctional acrylate; a salt; a solvent; and a viscosifier.

In another of its aspects, the present invention is directed to a process for preparing an electrolytic cell which comprises:

(a) providing an anode;
(b) providing a cathode;
(c) interposing between surfaces of the cathode and the anode an electrolyte composition comprising: an alkane multifunctional acrylate solid matrix forming monomer or partial polymer; a salt; a solvent; and a viscosifier;
(d) curing said electrolyte composition to form a solid electrolyte.

DETAILED DESCRIPTION OF THE PREFERRED EMBODIMENTS

This invention is directed to a solid, solvent-containing electrolyte derived from an alkane multifunctional acrylate and solid electrolytic cells made therefrom. The alkane multifunctional acrylate provides for enhanced ionic conductivity of the solid electrolyte layer formed therefrom. As a corollary, the inventive electrolyte affords better battery performance. Specifically, battery capacity and charge transfer are improved as a result of the increase in electrolyte conductivity.

However, prior to describing this invention in further detail, the following terms are defined below.

Definitions

As used herein, the following terms have the following meanings.

The term "solid polymeric matrix" refers to an electrolyte compatible material formed by polymerizing an organic monomer (or partial polymer thereof) and which, when used in combination with the other components of the electrolyte, renders the electrolyte solid. The solid matrix is ion-conducting. Suitable solid polymeric matrices include solid matrices formed from organic polymers or a mixture of organic polymers with inorganic non-polymeric or polymeric materials. Preferably, the solid polymeric matrix is an organic matrix derived from a solid matrix forming monomer and from partial polymers of a solid matrix forming monomer.

Examples of suitable solid matrix forming monomers include, by way of example, ethyleneimine, ethylene oxide, epichlorohydrine, acryloyl-derivatized polyalkylene oxides (disclosed in U.S. Pat. No. 4,908,283, which is incorporated herein) urethane acrylate, vinyl sulfonate polyalkylene oxides (as disclosed in U.S. Pat. No. 5,262,253 and incorporated herein) acrylic acid, chloroacrylic acid, bromoacrylic acid, crotonic acid, propylene, ethylene and the like as well as mixtures thereof.

Alternatively, the solid polymeric matrix can be used in combination with a non-polymeric inorganic matrix. See, for example, U.S. Pat. No. 4,990,413, which is incorporated herein by reference in its entirety. Suitable non-polymeric inorganic materials for use in conjunction with the solid polymeric matrix include, by way of example, β-alumina, silver oxide, lithium iodide, and the like. Suitable inorganic monomers are also disclosed in U.S. Pat. Nos. 4,247,499; 4,388,385; 4,414,607; 4,394,280; 4,432,891; 4,539,276; and 4,557,985 each of which is incorporated herein by reference. Examples of suitable inorganic solid matrix forming monomers include, by way of example, phosphazenes and siloxanes. Phosphazene monomers and the resulting polyphosphazene solid matrix are disclosed by Abraham et al., Proc. Int. Power Sources Symp., 34th, pp. 81–83 (1990) and by Abraham et al., J. Electrochemical Society, Vol. 138, No. 4, pp. 921–927 (1991).

The term "multifunctional alkane acrylate" refers to a solid matrix forming monomer (and partial polymer thereof) which can be polymerized, preferably in the presence of a salt and a solvent mixture, which preferably comprises organic carbonate(s) to form solid matrices which are suitable for use as solid electrolytes in electrolytic cells. When polymerized the inventive multifunctional alkane acrylate forms an ionically conductive matrix. The inventive solid matrix forming monomers have at least one heteroatom capable of forming donor acceptor bonds with the inorganic cations (e.g., alkali ions). The inventive multifunctional alkane acrylate can be combined with other solid matrix forming monomers and be copolymerized to form the solid matrix. Most preferably the solid electrolyte includes a viscosifier. Multifunctional alkane acrylates are derived by functionalizing an alkane with 2 or more (preferably 2 or 3) acrylates to permit sufficient cross-linking of the polymeric matrix to provide the requisite mechanical strength. Preferably each multifunctional alkane acrylate monomer (chain or branched) has about 2 to about 20 carbons, more preferably about 6 to 10 carbons, and most preferably about 4 carbons. The alkanes can be derivatized by conventional means. A preferred method of synthesizing multifunctional alkane acrylates is to react alkane polyols with acrylic acid in the presence of an acid catalyst.

Examples of suitable multifunctional alkane acrylates include: (1) alkane dioldiacrylates such as 1,4-butanediol diacrylate, 1,6-hexanediol diacrylate, 1,2,6-hexanetriol triacrylate, 1,12-dodecadiol diacrylate, and 2,4-pentanediol diacrylate and (2) trimethylolpropane triacrylate (TMPTA), as well as mixtures thereof. These are commercially available.

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized, preferably in the presence of a solvent, such as, a mixture of organic carbonates to form solid polymeric matrices which are suitable for use as solid electrolytes in electrolytic cells.

The term "cured" or "cured product" refers to the treatment of the solid matrix forming monomer or partial polymer thereof under polymerization conditions (including cross-linking) so as to form a solid polymeric matrix. Suitable polymerization conditions are well known in the art and include by way of example, heating the monomer, irradiating the monomer with UV light, electron beams, and the like.

The solid matrix forming monomer or partial polymer can be cured or further cured prior to or after addition of the salt, solvent, and viscosifier. For example, a composition comprising requisite amounts of the solid matrix forming monomer, inorganic ion salt, organic carbonate solvent, and viscosifier can be applied to a substrate and then cured. Alternatively, the solid matrix forming monomer can be first cured and then dissolved in a suitable volatile solvent. Requisite amounts of the inorganic ion salt, organic carbonate solvent, and viscosifier can then be added. The mixture is then placed on a substrate and cured; removal of the volatile solvent would result in the formation of a solid electrolyte. In either case, the resulting solid electrolyte would be a homogeneous, single phase product which is maintained upon curing, and does not readily separate upon cooling to temperatures below room temperature. Accordingly, the solid electrolyte of this invention does not include a separator as is typical of liquid electrolytes.

The term "salt" refers to any salt, for example, an inorganic salt, which is suitable for use in a solid electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $[N(SO_2CF_3)_2]^-$ and the like. Specific examples of suitable inorganic ion salts include $LiClO_4$, $LiI$, $LiSCN$, $LiBF_4$, $LiAsF_6$, $LiCF_3SO_3$, $LiPF_6$, $NaSCN$ and the like. The inorganic ion salt preferably contains at least one ion selected from the group consisting of $Li^+$, $Na^+$, $K^+$, $Cs^+$, $Rb^+$, $Ag^+$, $Cu^{+/+2}$ and $Mg^{+2}$.

The term "compatible electrolyte solvent," or "electrolytic solvent," or in the context of components of the solid electrolyte, just "solvent," is a low molecular weight organic plasticizer added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C., to simplify manufacture and increase the shelf life of the electrolyte/battery. Typical examples of solvent are mixtures of such materials as propylene carbonate, ethylene carbonate, gamma-butyrolactone, glyme, diglyme, triglyme, tetraglyme, dimethylsulfoxide, dioxolane, sulfolane, and the like. A particularly preferred solvent is disclosed in U.S. Pat. No. 5,262,253, which is incorporated herein. For electrochemical cells where the cathode comprises lithiated cobalt oxides, lithiated manganese oxides, or lithiated nickel oxides, and where the anode comprises carbon, the electrolytic solvent preferably comprises a mixture of ethylene carbonate and dimethyl carbonate. For electrochemical cells where the cathode comprises vanadium oxides, e.g., $V_6O_{13}$ and the anode is lithium, the electrolytic solvent preferably comprises a mixture of propylene glycol and triglyme.

The term "organic carbonate" refers to hydrocarbyl carbonate compounds of no more than about 12 carbon atoms and which do not contain any hydroxyl groups. Preferably, the organic carbonate is a linear aliphatic carbonate and most preferably a cyclic aliphatic carbonate. Suitable cyclic aliphatic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4-ethyl-1,3-dioxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl-1,3-dioxolan-2-one; 1,3-dioxan-2-one; 4,4-dimethyl-1,3-dioxan-2-one; 5,5-dimethyl-1-1,3-dioxan-2-one; 5-methyl-1,3-dioxan-2-one; 4-methyl-1,3-dioxan-2-one; 5,5-diethyl-1,3-dioxan-2-one; 4,6-diethyl-1,3-dioxan-2-one; 4,4,6-trimethyl-1,3-dioxan-2-one; and spiro (1,3-oxa-2-cyclohexanone-5',5',1',3'-oxa-2'-cyclohexanone).

Several of these cyclic aliphatic carbonates are commercially available such as propylene carbonate and ethylene carbonate. Alternatively, the cyclic aliphatic carbonates can be readily prepared by well known reactions. For example, reaction of phosgene with a suitable alkane-α,β-diol (dihydroxy alkanes having hydroxyl substituents on adjacent carbon atoms) or an alkane-α,γ-diol (dihydroxy alkanes having hydroxyl substituents on carbon atoms in a 1,3 relationship) yields an a cyclic aliphatic carbonate for use within the scope of this invention. See, for instance, U.S. Pat. No. 4,115,206, which is incorporated herein by reference in its entirety.

Likewise, the cyclic aliphatic carbonates useful for this invention may be prepared by transesterification of a suitable alkane-α,γ-diol or an alkane-α,γ-diol with, e.g., diethyl carbonate under transesterification conditions. See, for instance, U.S. Pat. Nos. 4,384,115 and 4,423,205 which are incorporated herein by reference in their entirety. Additional suitable cyclic aliphatic carbonates are disclosed in U.S. Pat. No. 4,747,850 which is also incorporated herein by reference in its entirety.

The term "viscosifier" refers to a suitable viscosifier for solid electrolytes. Viscosifiers include conventional viscosifiers such as those known to one of ordinary skill in the art. Suitable viscosifiers include film forming agents well known in the art which include, by way of example, polyethylene oxide, polypropylene oxide, copolymers thereof, and the like, having a number average molecular weight of at least about 100,000, polyvinylpyrrolidone, carboxymethylcellulose, and the like.

The term "electrolytic cell" or "electrochemical cell" refers to a composite containing an anode, a cathode and an ion-conducting electrolyte interposed therebetween.

The term "battery" refers to two or more electrochemical cells electrically interconnected in an appropriate series/parallel arrangement to provide the required operating voltage and current levels.

The anode is typically comprised of a compatible anodic material which is any material which functions as an anode in a solid electrolytic cell. Such compatible anodic materials are well known in the art and include, by way of example, lithium, lithium alloys, such as alloys of lithium with aluminum, mercury, manganese, iron, zinc, intercalation based anodes such as those employing carbon, tungsten oxides, and the like. Particularly preferred anodes include lithium intercalation anodes employing carbon materials such as graphite, cokes, mesocarbons, and the like. Such carbon intercalation based anodes typically include a polymeric binder suitable for forming a bound porous composite having a molecular weight of from about 1,000 to 5,000,000. Examples of suitable polymeric binders include EPDM (ethylene propylene diene termonomer), PVDF (polyvinylidene difluoride), EAA (ethylene acrylic acid copolymer), EVA (ethylene vinyl acetate copolymer), EAA/EVA copolymers, and the like. The anode also may include an electron conducting material such as carbon black.

The cathode is typically comprised of a compatible cathodic material (i.e., insertion compounds) which is any material which functions as a positive pole in a solid electrolytic cell. Such compatible cathodic materials are well known in the art and include, by way of example, transition metal oxides, sulfides, and selenides, including lithiated compounds thereof. Representative materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$, lithiated manganese oxides, e.g., $LiMn_2O_4$, lithiated nickel oxides, e.g., $LiNiO_2$, and mixtures thereof.

In one preferred embodiment, the compatible cathodic material is mixed with an electroconductive material including, by way of example, graphite, powdered carbon, powdered nickel, metal particles, conductive polymers (i.e., characterized by a conjugated network of double bonds like polypyrrole and polyacetylene), and the like, and a polymeric binder to form under pressure a positive cathodic plate. Suitable binders for use in the cathode have a molecular weight of from about 1,000 to 5,000,000. Examples of suitable polymeric binders include EPDM (ethylene propylene diene termonomer), PVDF (polyvinylidene difluoride), EAA (ethylene acrylic acid copolymer), EVA (ethylene vinyl acetate copolymer), EAA/EVA copolymers, and the like.

Methodology

A preferred method of fabricating an electrochemical cell is described herein. In addition, methods for preparing solid electrochemical cells and batteries are described in the art, for example, in U.S. Pat. Nos. 5,300,373, 5,316,556, 5,346,385, 5,262,253 and U.S. patent application Ser. No. 07/918,509 filed Jul. 22, 1992 now U.S. Pat. No. 5,620,810; Ser. No. 08/049,212, filed Apr. 19, 1993 pending; which are all incorporated herein in their entirety.

In one preferred embodiment, the cathode is prepared from a cathode paste which comprises from about 35 to 65 weight percent of a compatible cathodic material; from about 1 to 20 weight percent of an electroconductive agent; from about 0 to 20 weight percent of polyethylene oxide having a number average molecular weight of at least 100,000. When the cathode includes $V_6O_{13}$, the cathode paste preferably further comprises from about 10 to 50 weight percent of solvent comprising a 10:1 to 1:4 (w/w) mixture of an organic carbonate and a glyme; and from about 5 weight percent to about 25 weight percent of a sold matrix forming monomer or partial polymer thereof. Also included is an ion conducting amount of an inorganic ion salt. Generally, the amount of the salt is from about 1 to about 25 weight percent. (All weight percents are based on the total weight of the cathode.)

The electrolyte composition typically comprises from about 5 to about 25 weight percent of the inorganic ion salt based on the total weight of the electrolyte; preferably, from about 10 to 20 weight percent; and even more preferably from about 10 to about 15 weight percent. The percentage of salt present depends on the type of salt and electrolytic solvent employed.

The electrolyte composition typically comprises from 40 to about 80 weight percent electrolyte solvent (e.g., organic carbonate/glyme mixture) based on the total weight of the electrolyte; preferably from about 60 to about 80 weight percent; and even more preferably about 72 weight percent. The electrolyte composition typically comprises from about 5 to about 30 weight percent of the solid matrix monomer or partial polymer (or polymeric matrix formed therefrom) based on the total weight of the electrolyte; preferably from about 10 to about 20 weight percent.

In a preferred embodiment, the electrolyte composition further comprises a small amount of a film forming agent (also referred as a viscosifier). Suitable film forming agents are well known in the art and include, by way of example, polyethylene oxide, polypropylene oxide, copolymers thereof, and the like, having a numbered average molecular weight of at least about 100,000. Preferably, the film forming agent is employed in an amount of about 1 to about 10 weight percent and more preferably at about 2.5 weight percent based on the total weight of the electrolyte composition.

EXAMPLES

The following Examples illustrates a method of how an electrolytic cell could be fabricated.

Example 1

A solid electrolytic cell is prepared by first preparing a cathodic slurry which is spread onto a current collector. An electrolyte solution containing alkane multifunctional acrylate is then placed onto the cathode surface and the cathode slurry and electrolyte solution are simultaneously cured to provide for a solid electrolyte composition. Similarly, an anode composition is placed on a current collector and then an electrolytic solution is placed onto the anode composition and both are cured to form a solid electrolytic composition. Thereafter, the anode and cathode are laminated so that the solid electrolyte composition is situated therebetween to provide for a solid electrolytic cell. The specifics of this construction are as follows:

A. The Cathode Current Collector

The cathode current collector employed is a sheet of aluminum foil having a layer of adhesion promoter attached to the surface of the foil which will contact the cathode so as to form a composite having a sheet of aluminum foil, a cathode and a layer of adhesion promoter interposed therebetween. The aluminum foil is preferably an alloy that is identified by either the industry specifications 1235-H19 (99.35% min. Al), or 1145-H19 (99.45% min. Al), and which is available from All Foils, Inc., Brooklyn Heights, Ohio. (Alternatively, aluminum mesh can be used as the current collector.)

The adhesion promoter layer is prepared as a dispersed colloidal solution in one of two methods. The first preparation of this colloidal solution for this example is as follows:

8.44 parts by weight of carbon powder (Shawinigan Black™—available from Chevron Chemical Company, San Ramon, Calif.)

33.76 parts by weight of a 25 weight percent solution of polyacrylic acid (a reported average molecular weight of about 90,000, commercially available from Aldrich Chemical Company—contains about 84.4 grams polyacrylic acid and 253.2 grams water)

57.80 parts by weight of isopropanol

In a preferred embodiment of the first method, an additional amount of water, e.g., 2–3 weight percent water based on the total weight of the colloidal solution, is incorporated to enhance coatability. Also, about 1 weight percent methyl ethyl ketone is added to the composition to enhance wettability of the aluminum.

The carbon powder and isopropanol are combined with mixing in a conventional high shear colloid mill mixer (Ebenbach-type colloid mill) until the carbon is uniformly dispersed and the carbon particle size is smaller than 10 $\mu$m. At this point, the 25 weight percent solution of polyacrylic acid is added to the mixer and further mixed for approximately 15 minutes. The resulting mixture is pumped to the coating head and applied by a reverse Gravure roller onto a sheet of aluminum foil about 9 in. (22.86 cm) wide and about 0.0005 in. (0.00127 cm) to about 0.001 in. (0.00254 cm) thick. After application, the solvent is evaporated by placing the mixture/foil into a conventional oven. After evaporation, an electrically-conducting adhesion-promoter layer of about 4–6 $\mu$m in thickness is formed. The aluminum foil is then cut to about 8 in. (20.32 cm) wide by removing approximately ½ in. (1.27 cm) from the sides with a conventional slitter so as to remove any uneven edges; the foil can then be further cut to the desired size.

The second preparation of this colloidal solution comprises mixing 25 lbs (11.35 kg) of carbon powder (Shawinigan Blacks™) with 100 lbs (45.4 kg) of a 25 weight percent solution of polyacrylic acid (average molecular weight of about 240,000, commercially available from BF Goodrich, Cleveland, Ohio, as Good-Rite K702—contains about 25 lbs (11.35 kg) polyacrylic acid and 75 lbs (34.05 kg) water) and with 18.5 lbs (8.399 kg) of isopropanol. Stirring is done in a 30 gallon (113.55 liters) polyethylene drum with a gear-motor mixer (e.g., Lighting Labmaster Mixer, model XJ-43, available from Cole-Parmer Instruments Co., Niles, Ill.) at 720 rpm with two 5 in. (12.7 cm) diameter A310-type propellers mounted on a single shaft. This wets down the carbon and eliminates any further dust problem. The resulting weight of the mixture is 143.5 lbs (65.149 kg) and contains some "lumps."

The mixture is then further mixed with an ink mill which consists of three steel rollers almost in contact with each other, turning at 275, 300, and 325 rpms respectively. This high shear operation allows particles that are sufficiently small to pass directly through the rollers. Those that do not pass through the rollers continue to mix in the ink mill until they are small enough to pass through these rollers. When the mixing is complete, the carbon powder is completely dispersed. A Hegman fineness of grind gauge (available from Paul N. Gardner Co., Pompano Beach, Fla.) indicates that the particles are 4–6 $\mu$m with the occasional 12.5 $\mu$m particles. The mixture can be stored for well over 1 month without the carbon settling out or reagglomerating.

When this composition is to be used to coat the current collector, an additional 55.5 lbs (25.197 kg) of isopropanol is mixed into the composition working with 5 gallon (18.925 l) batches in a plastic pail using an air powered shaft mixer (Dayton model 42231 available from Granger Supply Co., San Jose, Calif.) with a 4 in. (10.16 cm) diameter Jiffy-Mixer brand impeller (such as an impeller available as Catalog No. G-04541-20 from Cole Parmer Instrument Co., Niles, Ill.).

Then, it is gear pumped through a 25 μm cloth filter (e.g., So-Clean Filter Systems, American Felt and Filter Company, Newburgh, N.Y.) and coated as described above.

B. The Cathode

The cathode is prepared from a cathodic slurry which, in turn, is prepared from a cathode powder as follows:

i. Cathode Powder

The cathode powder is prepared by combining 94.1±1.1 weight percent $LiMn_2O_4$ and 5.9±1.1 weight percent of carbon (Shawinigan Black™). About 100 grams of the resulting mixture is placed into a grinding machine (Attritor Model S-1 available from Union Process, Akron, Ohio) and ground for 30 minutes at 150 rpm Afterwards, the resulting mixture is passed through a 200 mesh screen and then vacuum dried at 60° C. to produce a cathode powder with a water content of less than about 1000 ppm and preferably less than about 300 ppm.

ii. Cathode Slurry

A cathode slurry is prepared by combining sufficient cathode powder to provide for a final product having about 51.7 weight percent $LiMn_2O_4$. The slurry contains the following (in approximate weight percent):

| | |
|---|---|
| $LiMn_2O_4$ | 51.744% |
| Carbon | 6.456% |
| EPDM (ethylene propylene diene monomer) | 1.8% |
| Xylene | 40.0% |
| | 100% |

The method of preparing 100 grams of the cathode slurry is as follows:

1.8 grams of EPDM (Mooney viscosity of 26±5 and available as VISTALON™ 2504 from Exxon Chemical Co., Houston, Tex.) is mixed in 16.2 grams of xylene to form a 10.0% (wt.) EPDM solution. The temperature is maintained at between 40°–45° C. as the EPDM is added. The solution is preferably filtered through a 20 micron filter cartridge.

An amount of carbon powder sufficient to provide 51.744 grams of $LiMn_2O_4$ per 100 grams of cathode slurry and a sufficient amount of carbon (Shawinigan Black™) to provide 6.456 grams of total carbon per 100 grams of slurry are mixed in a double planetary mixer where the blend is stirred at 7.5 Hz and 25° C. The above EPDM-xylene solution is passed through 4A molecular sieves and then added to the $LiMn_2O_4$ and carbon blend under vacuum mixing over a 5 minute period during which time an additional 23.8 grams of xylene are added. Afterwards, the mixing speed is increased from 7.5 to 20 Hz and maintained for another 5 minutes. Thereafter, the temperature of the mixture is gradually raised to 85° C. over about a 45 minute period and maintained at the elevated temperature for about 30 minutes. Next, the mixing speed is decreased to about 1 Hz and subsequently the temperature of the mixture is allowed to decrease gradually to about 45° C. over about a 30 minute period. Finally, the mixture is mixed for 5 minutes at this temperature.

The extruded cathode slurry is then spread to a substantially uniform thickness of about 25–200 μm, more preferably 50–100 μm, and most preferably about 100 μm, over the current collector by a doctor blade, Meyer-rod, or by reverse roll coating. The cathode slurry/current collector is heated to remove the xylene.

C. Electrolyte 36.26 grams of propylene carbonate, 36.26 grams of ethylene carbonate, and 17.24 grams of 1,6-hexanediol diacrylate are combined at room temperature until homogeneous. The resulting solution is optionally passed through a column of 4 Å molecular sieves to remove water and then the recovered solution is mixed at room temperature until homogeneous. If necessary, the ethylene carbonate can first be dissolved in propylene carbonate with heat.

At this point, 1.47 grams of polyethylene oxide film forming agent having a number average molecular weight of about 600,000 (available as Polyox WSR-205 from Union Carbide Chemicals and Plastics, Danbury, Conn.) is added to the above solution and then dispersed while stirring with a magnetic stirrer over a period of about 60–120 minutes. After dispersion, the solution is heated to between 60° and 65° C. with stirring until the film forming agent is dissolved. A thermocouple is placed at the edge of the vortex created by the magnetic stirrer to monitor solution temperature. The solution is cooled to a temperature of less than 48° C. and then 8.77 grams of $LiPF_6$ are added to the solution over a 120 minute period while thoroughly mixing to ensure a substantially uniform temperature profile throughout the solution. Cooling is applied as necessary to maintain the temperature of the solution at less than 48° C.

In one optional embodiment, the polyethylene oxide film forming agent is added to the solution via a mini-sieve, such as a 25 mesh mini-sieve that is commercially available as Order No. 57333-965 from VWR Scientific, San Francisco, Calif.

The resulting solution contains the following, in approximate weight percent based on the total weight of the electrolyte solution (100 g):

| | |
|---|---|
| Propylene Carbonate | 36.26% |
| Ethylene Carbonate | 36.26% |
| 1,6-hexanediol diacrylate | 17.24% |
| $LiPF_6$ | 8.77% |
| PEO Film Forming Agent | 1.47% |
| Total | 100% |

This solution is then degassed to provide for an electrolyte solution wherein little, if any, of the $LiPF_6$ salt decomposes.

Optionally, the above solution which contains the prepolymer, the film forming agent, the electrolytic solvents and the $LiPF_6$ salt, is filtered to remove any solid particles or gels remaining in the solution. One suitable filter device is a sintered stainless steel screen having a pore size between 1 and 50 μm at 100% efficiency.

In an alternative embodiment, the electrolyte is prepared by the following steps using the same above described electrolyte components:

1. Check the moisture level of the 1,6-hexanediol diacrylate. If the moisture level is less than 100 ppm water, proceed to step 2. If not, then first dissolve the 1,6 -hexanediol diacrylate at room temperature, <30° C., in the propylene carbonate and ethylene carbonate and dry the solution over 4A molecular sieves (Grade 514, 8–12 Mesh from Schoofs Inc., Moraga, Calif.) and then proceed to step 4.

2. Dry the propylene carbonate and ethylene carbonate over 4A molecular sieves (Grade 514, 8–12 Mesh from Schoofs Inc., Moraga, Calif.).

3. At room temperature, <30° C., add the 1,6-hexanediol diacrylate to the solvent prepared in step 2. Stir until the resin is completely dissolved. The solution should be clear and colorless.

4. Dry and optionally sift the polyethylene oxide film forming agent through a 25 mesh mini-sieve commercially available as Order No. 57333-965 from VWR Scientific, San Francisco, Calif. While stirring add the dried and pre-sifted polyethylene oxide film forming agent slowly to the solution. The polyethylene oxide film forming agent should be sifted into the center of the vortex formed by the stirring means at a controlled rate to avoid agglomerate formation. Addition of the polyethylene oxide film forming agent should be dispersive and, during addition, the temperature should be maintained at room temperature (<30° C.).

5. After final addition of the polyethylene oxide film forming agent, stir to ensure that the film forming agent is substantially dispersed.

6. Heat the mixture to 68° to 75° C. and stir until the film forming agent has melted and the solution has become transparent. Optionally, in this step, the mixture is heated to 65° to 68° C.

7. Cool the solution produced in step 6 and when the temperature of the solution reaches 40° C., add the $LiPF_6$ salt very slowly making sure that the maximum temperature does not exceed 55° C. and preferably does not exceed about 40° C.

8. Following the addition of the $LiPF_6$ salt, the solution is stirred and degassed. The electrolyte solution is allowed to cool before usage.

9. Optionally, filter the solution through a sintered stainless steel screen having a pore size between 1 and 50 μm at 100% efficiency.

At all times, the temperature of the solution should be monitored with a thermocouple which should be placed in the vortex formed by the mixer.

Afterwards, the electrolyte mixture is coated by a slot die coater or a reverse roll flexographic coater to a thickness of about 25–50 μm onto the surface of the dried cathode slurry described above.

D. The Anode Current Collector

The anode current collector employed is a sheet of copper foil, about 0.33 mils (8.5 μm) to 0.5 mils (12.7 μm) thick, having a layer of adhesion promoter attached to the surface of the foil which will contact the anode so as to form a composite having a sheet of copper foil, an anode and a layer of adhesion promoter interposed therebetween. (Alternatively, copper mesh can be used as the current collector.)

The same adhesion promoter composition used with the cathode is employed with the anode.

E. The Anode

The anode is prepared from an anodic slurry which, in turn, is prepared from an anode powder as follows:

i. Anode Powder

The anode powder is prepared by combining about 93.81 weight percent of Mitsubishi Gas Carbon™ (a coke-like material) (Mitsubishi Petroleum Co. Ltd, Tokyo, Japan) and about 6.19 weight percent of carbon (Shawinigan Black™). About 100 grams of the resulting mixture is placed into a grinding machine (Attritor Model S-1 available from Union Process, Akron, Ohio) and ground for 30 minutes at 150 rpm Afterwards, the resulting mixture is passed through a 200 mesh screen and then vacuum dried at 60° C. to produce an anode powder with a water content of less than about 1000 ppm and preferably less than about 300 ppm.

ii. Anode Slurry

An anode slurry is prepared by combining sufficient anode powder to provide for a final product having about 54.6 weight percent of the Mitsubishi Gas Carbon. The slurry contains the following (in approximate weight percent):

| | |
|---|---|
| Mitsubishi Gas Carbon | 54.6% |
| Carbon | 3.6% |
| EPDM (ethylene propylene diene monomer) | 1.8% |
| Xylene | 40.0% |
| | 100% |

The method of preparing 100 grams of the anode slurry is as follows:

1.8 grams of EPDM (VISTALON™ 2504) is mixed in 16.2 grams of xylene to form a 10.0% (wt.) EPDM solution. The temperature is maintained at between 40°–45° C. as the EPDM is added to the xylene. The solution is preferably filtered through a 20 micron filter cartridge.

An amount of anode powder sufficient to provide 54.6 grams of Mitsubishi Gas Carbon per 100 grams of anode slurry and a sufficient amount of carbon (Shawinigan Black™) to provide 3.6 grams of total carbon per 100 grams of slurry are mixed in a double planetary mixer where the blend is stirred at 7.5 Hz and 25° C. The above EPDM-xylene solution is passed through 4A molecular sieves and then added to the Gas Carbon and carbon blend under vacuum mixing over a 5 minute period during which time an additional 23.8 grams of xylene are added. Afterwards, the mixing speed is increased from 7.5 to 20 Hz and maintained for another 5 minutes. Thereafter, the temperature of the mixture is gradually raised to 85° C. over about a 45 minute period and maintained at the elevated temperature for about 30 minutes. Next, the mixing speed is decreased to about 1 Hz and subsequently the temperature of the mixture is allowed to decrease gradually to about 45° C. over about a 30 minute period. Finally, the mixture is mixed for 5 minutes at this temperature.

The so-prepared anode slurry can be placed onto the adhesion layer of the current collector by coating a layer of the slurry having a substantially uniform thickness of about 25–200 μm, more preferably 50–100 μm, and most preferably about 50 μm, over the current collector by a doctor blade, Meyer-rod, or by reverse roll coating. The anode slurry/current collector is then heated to remove the xylene.

Afterwards, an electrolyte mixture is coated by a slot die coater or a reverse roll flexographic coater to a thickness of about 25–50 μm onto the surface of the dried anode slurry described above.

F. The Solid Electrolytic Cell

A sheet comprising a solid battery is prepared by laminating the electrolyte/anode composite with the electrolyte/cathode composite so that the electrolyte is positioned between the anode and cathode. Lamination is accomplished by minimal pressure.

Example 2

In another method, an electrolytic cell can be prepared as follows:

A. The cathode

The cathode is prepared from a cathodic paste which has the following components in approximate weight percent:

| | |
|---|---|
| V$_6$O$_{13}$ | 45.00% |
| Carbon | 10.00% |
| Propylene carbonate | 27.18% |
| Triglyme | 6.80% |
| Polyethylene glycol diacrylate | 8.51% |
| Ethoxylated trimethylpropane triacrylate[1] | 1.51% |
| Polyethylene oxide | 1.00% |

[1]Inhibitor may be removed from both the polyethylene glycol diacrylate and ethoxylated trimethylpropane triacrylate by contacting each of these compounds with an Inhibitor Remover available as Product No. 31,133-2 from Aldrich Chemical, Milwaukee, Wisconsin, which results in less than 50 ppm of inhibitor in the product.

The cathode paste is then placed onto a sheet (about 1 mil (N-25 μm) thick by 10 cm wide) of a roughened nickel on nickel current collector (available as CF18/NiT from Fukuda Metal Foil & Powder Company, Ltd., Kyoto, Japan). A Mylar cover sheet can then be placed over the paste and the paste spread to a thickness of about 75 microns (μm) with a conventional plate and roller system and cured by continuously passing the sheet through an electron beam apparatus (Electrocurtain, Energy Science Inc., Woburn, Mass.) at a voltage of about 175 kV and a current of about 12 mA and at a conveyor belt speed setting of 50 which provides a conveyor speed of about 3 in/sec. After curing, the Mylar sheet can be removed which should provide for a solid cathode laminated to a nickel on nickel current collector.

B. Electrolyte

The electrolyte is formed from a mixture comprising the following components:

| | |
|---|---|
| Propylene carbonate | 56.5% |
| Triglyme | 14% |
| 1,6-hexanediol diacrylate | 17% |
| LiPF$_6$ | 10% |
| Polyethylene oxide | 2.5% |

Afterwards, the electrolyte mixture can then be coated by a conventional knife blade to a thickness of about 50 μm onto the surface of the cathode sheet prepared as above (on the side opposite that of the current collector) but without the Mylar covering. The electrolyte can then be cured by continuously passing the sheet through an electron beam apparatus (Electrocurtain, Energy Science Inc., Woburn, Mass.) at a voltage of about 175 kV and a current of about 1.0 mA and at a conveyor speed setting of 50 which provides for a conveyor speed of about 1 cm/sec. After curing, a composite is recovered which should contain a solid electrolyte laminated to a solid cathode which, in turn, is laminated to a nickel on nickel current collector.

C. Anode

The anode may comprise a sheet of lithium foil (about 51 μm thick) which is commercially available from FMC Corporation Lithium Division, Bessemer City, N.C.

D. The Solid Battery

A solid battery may be prepared by first preparing a cathodic paste as described above which can be spread onto a substrate, e.g., a current collector, and then cured to provide the cathode. An electrolyte composition as described above can then be placed onto the cathode surface and cured to provide for the solid electrolyte. Then, the anode can be laminated onto the solid electrolyte to provide for the solid battery.

Although only preferred embodiments of the invention are specifically disclosed and described above, it will be appreciated that many modifications and variations of the present invention are possible in light of the above teachings and within the purview of the appended claims without departing from the spirit and intended scope of the invention.

What is claimed is:

1. A solid, single-phase, solvent-containing electrolyte which comprises:
   a solid polymeric matrix derived by polymerizing an alkane multifunctional acrylate that is selected from the group consisting of 1,4-butanediol diacrylate, 1,6-hexanediol diacrylate, 1,2,6-hexanetriol triacrylate, 1,12-dodecadiol diacrylate, 2,4-pentanediol diacrylate, and mixtures thereof;
   a salt;
   an electrolytic solvent; and
   a viscosifier.

2. The solid electrolyte of claim 1 wherein said alkane multifunctional acrylate is 1,4-butanediol diacrylate.

3. The solid electrolyte of claim 1 wherein the viscosifier comprises polyethylene oxide which comprises about 1 to about 10% (wt) of the electrolyte.

4. The solid electrolyte of claim 1, wherein said alkane multifunctional acrylate is 1,6-hexanediol diacrylate.

5. The solid electrolyte of claim 1, wherein said alkane multifunctional acrylate is 1,2,6-hexanetriol triacrylate.

6. The solid electrolyte of claim 1, wherein said alkane multifunctional acrylate is 1,12-dodecadiol diacrylate.

7. The solid electrolyte of claim 1, wherein said alkane multifunctional acrylate is 2,4-pentanediol diacrylate.

8. An electrolytic cell which comprises:
   an anode which is a carbon intercalation based anode containing graphite
   a cathode comprising an insertion compound;
   and interposed therebetween a solid, solvent-containing electrolyte which comprises:
   a solid polymeric matrix derived by polymerizing an alkane multifunctional acrylate that is selected from the group consisting of 1,4-butanediol diacrylate, 1,6-hexanediol diacrylate, 1,2,6-hexanetriol triacrylate, 1,12-dodecadiol diacrylate, 2,4-pentanediol diacrylate, and mixtures thereof;
   a salt;
   an electrolytic solvent; and
   a viscosifier.

9. The electrolytic cell of claim 8, wherein said alkane multifunctional acrylate is 1,4-butanediol diacrylate.

10. The electrolytic cell of claim 8 wherein the viscosifier comprises polyethylene oxide which comprises about 1 to about 10% (wt) of the solid electrolyte.

11. The electrolytic cell of claim 8 wherein the cathode comprises material selected from the group consisting of vanadium oxides, lithiated cobalt oxides, and lithiated manganese oxides.

12. The electrolytic cell of claim 8, wherein said alkane multifunctional acrylate is 1,6-hexanediol diacrylate.

13. The electrolytic cell of claim 8 wherein said alkane multifunctional acrylate is 1,2,6-hexanetriol triacrylate.

14. The electrolytic cell of claim 8, wherein said alkane multifunctional acrylate is 1,12-dodecadiol diacrylate.

15. The electrolytic cell of claim 8, wherein said alkane multifunctional acrylate is 2,4-pentanediol diacrylate.

16. A process for preparing an electrolytic cell which comprises:
   (a) providing an anode which is a carbon intercalation based anode containing graphite;
   (b) providing a cathode comprising an insertion compound;

(c) interposing between surfaces of the cathode and the anode an electrolytic composition comprising:

an alkane multifunctional acrylate matrix forming monomer that is selected from the group consisting of 1,4-butanediol diacrylate, 1,6-hexanediol diacrylate, 1,2,6-hexanetriol triacrylate, 1,12-dodecadiol diacrylate, 2,4-pentanediol diacrylate, mixtures thereof and partial polymer thereof;

a salt;

an electrolytic solvent; and a viscosifier; and (d) curing said electrolyte composition to form a solid electrolyte.

17. The process of claim 16 wherein said alkane multifunctional acrylate solid matrix forming monomer is 1,4-butanediol diacrylate.

18. The process of claim 16 wherein said viscosifier comprises polyethylene oxide which comprises about 1 to about 10% (wt) of the electrolyte composition.

19. The process of claim 16 wherein said alkane multifunctional acrylate is 1,6-hexanediol diacrylate.

20. The process of claim 16 wherein said alkane multifunctional acrylate is 1,2,6-hexanetriol triacrylate.

21. The process of claim 16 wherein said alkane multifunctional acrylate is 1,12-dodecadiol diacrylate.

22. The process of claim 16 wherein said alkane multifunctional acrylate is 2,4-pentanediol diacrylate.

* * * * *